(12) United States Patent
Babinski

(10) Patent No.: US 6,266,258 B1
(45) Date of Patent: Jul. 24, 2001

(54) POWER SUBSTRATE ELEMENT TOPOLOGY

(75) Inventor: Thomas E. Babinski, Kenosha, WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 856 days.

(21) Appl. No.: 08/536,232

(22) Filed: Sep. 29, 1995

(51) Int. Cl.$^7$ ............... H02H 7/122; H02M 5/45
(52) U.S. Cl. ........................... 363/56.02; 363/37
(58) Field of Search ................. 363/36, 37, 51, 363/56

(56) References Cited

U.S. PATENT DOCUMENTS

| 5,055,990 | * | 10/1991 | Miki et al. | 363/56 |
| 5,123,746 | * | 6/1992 | Okado | 363/37 |

* cited by examiner

*Primary Examiner*—Peter S. Wong
*Assistant Examiner*—Bao Q. Vu
(74) *Attorney, Agent, or Firm*—Patrick S. Yoder; A. M. Gerasimow

(57) ABSTRACT

An inverter circuit includes a pair of switching devices coupled in series across high and low sides of a direct current bus. An output line is coupled between the devices for conducting controlled alternating current power produced by timed switching of the devices. A flyback diode is electrically coupled a in parallel with each switching device and is physically positioned adjacent to the opposite switching device in the pair. Conducting paths between each diode and the associated switching device are preferably physically positioned adjacent to conducting paths between the switching devices and the output line. The placement of the elements cancels or reduces parasitic inductance during switching. Three similar arrangements may be provided in parallel in a three phase inverter. The inverter may be incorporated into a power substrate including a rectifying circuit for converting alternating current power to direct current power to be applied to the bus.

18 Claims, 3 Drawing Sheets

POWER SUBSTRATE ELEMENT TOPOLOGY

BACKGROUND OF THE INVENTION

The present invention relates generally to the art of electrical power substrates. More particularly, the invention relates to an advantageous arrangement of switching devices and diodes in an inverting circuit of the type used in power substrates.

In the art of power electronics, numerous applications are known for switch-mode inverter circuits. Such circuits typically include a pair of solid state switching devices, such as semiconductor controlled rectifiers (SCR's), power transistors, insulated gate bipolar transistors (IGBT's) or the like, coupled in series across a direct current (DC) power bus. A flyback diode is coupled in parallel with each switching device. Input DC power is commonly applied to the inverter circuit via a direct current bus from a rectifying and filtering circuit coupled to a source of alternating current (AC) power. By controlled operation of the switching devices, such as by pulse-width-modulation, AC power output is obtained in an output line between the switching devices at desired frequency and voltage. The circuits may be configured for single or three phase applications, such as in AC motor drives.

During controlled switching of such inverter circuits, voltage spikes are commonly encountered due to parasitic inductance, particularly between the switching devices and the output line. In particular, due to the topology of known inverter circuits, parasitic inductance is problematic during transient turnoff periods due to the length of current carrying paths between each switching device and the opposing diode, as well as to the close proximity of the flyback diodes to their corresponding switching devices, and the proximity of current paths between the output line and the diodes. The adverse effects of such parasitic inductance is especially troublesome in applications where controlled switching is extremely rapid, such as in pulse-width-modulation techniques used to generate AC output having desired waveforms.

Thus, there is a need for an improved inverter topology which reduces or eliminates such parasitic inductance and thereby improves the characteristics of the output power waveforms. In particular, there is a need for an improved circuit topology of this type that can be employed in a rather straightforward manner in both single phase and three phase inverter arrangements, such as in power substrates for devices such as variable frequency motor drives.

SUMMARY OF THE INVENTION

The present invention features a novel topology for inverter circuits of the type incorporated in power substrates and similar devices. The topology employs placement of the switching devices and flyback diodes that advantageously cancels or reduces parasitic inductance during transient switching phases of operation. In particular, the topology permits current carrying paths between switching devices and their opposing diodes to be shortened considerably as compared to existing inverter circuitry. The topology also judiciously places each switching device physically adjacent to the opposing diode and permits current carrying paths between the diodes and switching devices to be physically routed so as to contribute to inductance cancelling effects. The technique is applicable both to single phase inverter circuits as well as to three phase circuits.

Thus, in accordance with one aspect of the invention, an inverter circuit for converting direct current power from a direct current bus to controlled alternating current power includes a high side switching device, a low side switching device, and a pair of flyback diodes. The high side switching device is coupled between a high side of the bus and an output line, while the low side switching device coupled between a low side of the bus and the output line. A first of the flyback diodes is electrically coupled in parallel with the high side switching device and disposed adjacent to the low side switching device. The second flyback diode is electrically coupled in parallel with the low side switching device and disposed adjacent to the high side switching device.

In accordance with another aspect of the invention, a three phase inverter circuit for converting direct current electrical power from a direct current bus to alternating current power includes first, second and third phase inverters. Each inverter includes high and low side switching devices and a pair of flyback diodes. The high side switching device of each inverter is coupled between a high side of the bus and a respective output line, while the low side switching device is coupled between a low side of the bus and the output line. A first of the flyback diodes in each inverter is electrically coupled in parallel with the high side switching device of the inverter and is disposed adjacent to the low side switching device. The second flyback diode of each inverter is electrically coupled in parallel with the low side switching device of the inverter and disposed adjacent to the high side switching device.

In accordance with another aspect of the invention, a power substrate for converting alternating current power from a source to controlled frequency alternating current power includes a rectifier circuit, a direct current bus and an inverter circuit. The rectifier circuit is configured for converting alternating current power from the source to direct current power. The direct current bus is coupled to the rectifier circuit for conducting direct current power from the rectifier circuit and includes a high side bus and a low side bus. The inverter circuit includes high and low side switching devices and first and second flyback diodes. The high side switching device is coupled between the high side bus and an output line. The low side switching device is coupled between the low side bus and the output line. The first flyback diode is electrically coupled between the high side bus and the output line and is disposed adjacent to the low side switching device, while the second flyback diode is electrically coupled between the low side bus and the output line and is disposed adjacent to the high side switching device.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
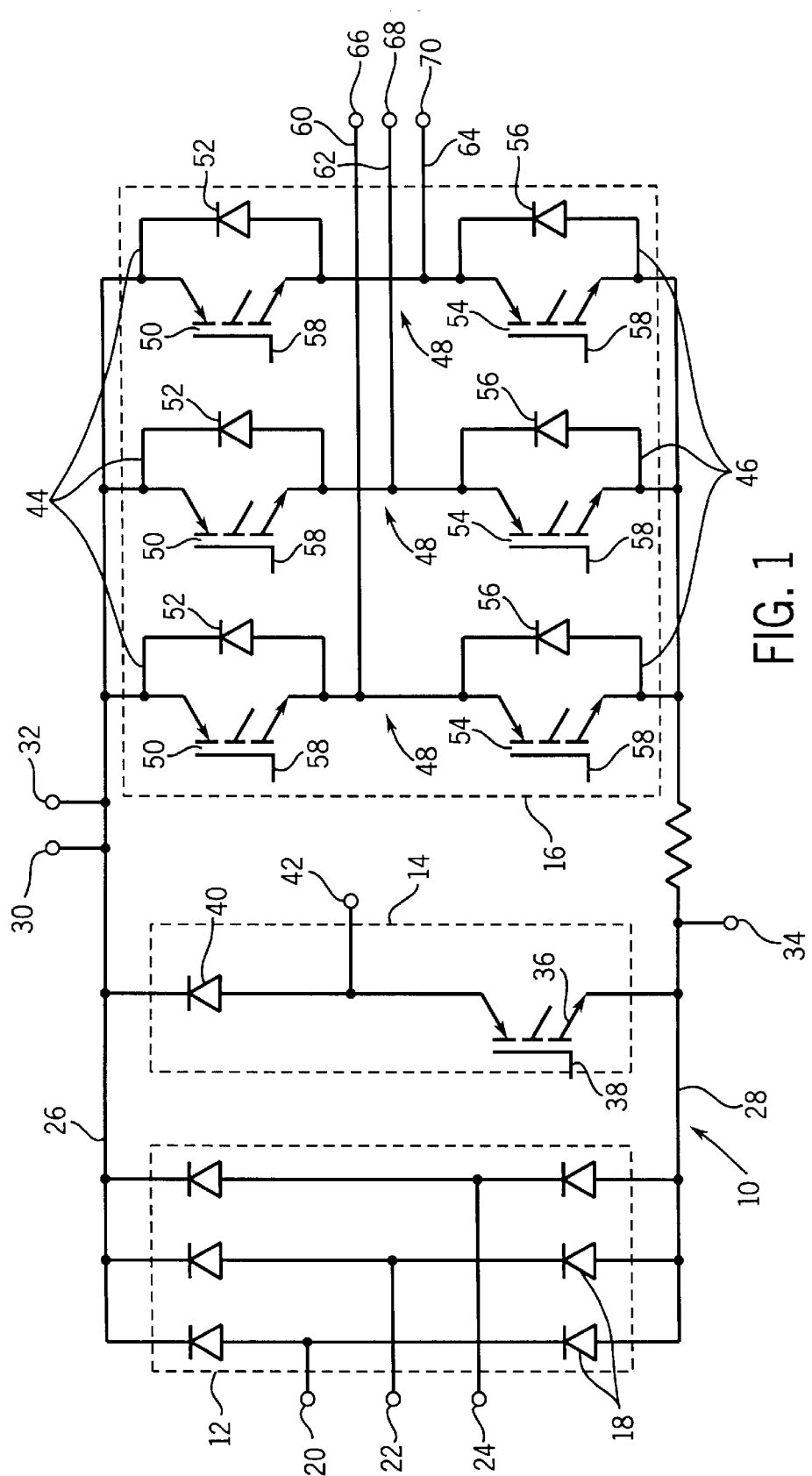
FIG. 1 is a schematic illustration of a typical three phase power substrate circuit of the type found in motor controllers and similar equipment.

Turning now to the drawings and referring first to FIG. 1, a power substrate 10, such as for use in a motor controller or other power electronic device, is illustrated as including a rectifier circuit 12, a breaking resistor switch circuit 14 and an inverter circuit 16. Rectifier circuit 12 includes three pairs of diodes 18 for converting three-phase AC from a source of electrical power to direct current power. Rectifier circuit 12 is thus coupled to input terminals 20, 22 and 24 that, in a typical installation, are in turn coupled to upstream protective circuitry, such as fuses, circuit breakers and the like. Rectifier circuit 12 outputs direct current power through a direct current bus including a high side line 26 and a low side line 28. Terminals 30 and 32 are coupled to high side line 26 while an additional terminal 34 is coupled to low side line 28 for coupling substrate 10 to external break resistors, capacitors and the like in a manner well known in the art.

Switching circuit 14 includes a switching device 36 having a base drive 38 for controlling the state of switching device 36. Drive 38 is typically coupled to a microprocessor-based controller or similar device. Circuit 14 further includes a diode 40 for preventing current flow from high side line 26 to low side line 28 during normal operation of power substrate 10. A terminal 42 is provided between switching device 36 and diode 40 for coupling circuit 14 to an external breaking resistor or similar device.

Inverter circuit 16 includes three pairs of switching circuits, each pair including a high side switching circuit 44 and a low side switching circuit 46. Each pair of switching circuits 44 and 46 thus forms an inverter 48 for converting DC power from the direct current bus to controlled AC power. Each high side switching circuit 44 includes a switching device 50 electrically coupled in parallel with a flyback diode 52 as shown in FIG. 1. Each low side switching circuit 46 similarly includes a switching device 54 electrically coupled in parallel with a flyback diode 56. Switching devices 50 and 54 are coupled in series between high side line 26 and low side line 28 and are driven by input control signals through respective base drives 58, such as by a microprocessor controller or a similar control device of a type well known in the art. Output lines 60, 62 and 64 are coupled to each pair of switching devices and terminate in terminals 66, 68 and 70, respectively.

In operation, control signals originating in an inverter controller, typically including a programmed microprocessor, direct timed shifting of switching devices 50 and 54 between conducting and non-conducting states to generate three-phase output power available at terminals 66, 68 and 70, having desired waveform, voltage magnitude and frequency characteristics, such as for driving electric motors (not shown) or for other power electronics applications.

In heretofore known inverter circuits of the type illustrated in FIG. 1, high side switching circuits 44 and low side switching circuits 46 are typically physically placed in much the same manner as shown diagrammatically in FIG. 1. Thus, switching devices 50 and 54 are physically situated in close proximity to their respective flyback diodes 52 and 56, creating relatively long current carrying paths between each switching device and the opposing diode. In certain applications, circuits 44 and 46 are prepackaged as modules including a solid state switch, such as an insulated gate bipolar transistor, a semiconductor controlled rectifier or a similar switching device, and a flyback diode precoupled in parallel with the switching device. Such arrangements tend to result in voltage spikes, particularly during rapid, coordinated switching of devices 50 and 54 due to parasitic inductance in current conducting paths between the switching devices and diodes, and their respective output line.

Figure 2:
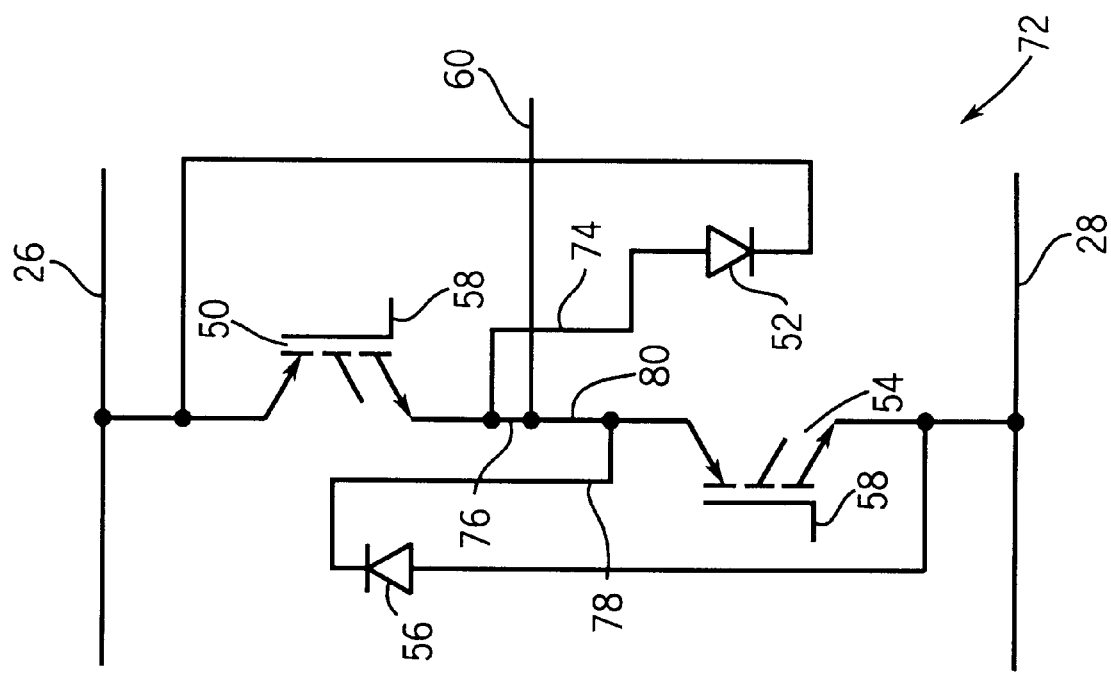
FIG. 2 is a schematic view of a component arrangement for reducing parasitic inductance in a single phase inverter.

FIG. 2 diagrammatically illustrates the topology of an inverter circuit 72 in accordance with one aspect of the present invention. As shown in FIG. 2, inverter circuit 72 comprises a pair of switching devices, including a high side switching device 50 and a low side switching device 54, in parallel with which flyback diodes 52 and 56, respectively, are electrically coupled (e.g. device 50 is coupled in parallel with diode 52, and device 54 is coupled in parallel with diode 56). As described above with respect to inverter circuit 46, switching devices 50 and 54 are coupled in series between high side line 26 and low side line 28 of the DC bus and an output line 60 is coupled between devices 50 and 54. The conducting state of both switches is changed in response to control signals applied at their respective base 58. As illustrated in FIG. 2, rather than being located adjacent to their respective switching devices, diodes 52 and 56 are physically positioned adjacent to the other or opposing switching device in inverter 72. Thus, high side diode 52 is physically positioned adjacent to low side switching device 54, while low side diode 56 is physically positioned adjacent to high side switching device 50. Moreover, at least a portion of a current path 74 electrically linking diode 52 to switching device 50 is physically positioned adjacent to a portion of a current path 76 linking switching device 50 to output line 60. Similarly, at least a portion of a current path 78 linking diode 56 to switching device 54 is physically positioned adjacent to a current path 80 linking switching device 54 to output line 60.

It should be noted that, while the current carrying paths between the switching devices and their opposing diodes appear lengthened in the schematic diagram, in a physical circuit, as will be apparent to those skilled in the art, the topology described above actually permits these current carrying paths to be shortened considerably as compared to the known inverter circuits described above. Moreover, the physical positioning of elements 50, 52, 56 and 58 and of current paths 74 through 80 contributes to cancelling or reducing parasitic inductance in inverter circuit 72, thereby eliminating or reducing the adverse effects of such inductance during switching of devices 50 and 54. The topology illustrated in FIG. 2 is preferably physically attained by fixing switching devices 50 and 54 in place on a power substrate adjacent to flyback diodes 56 and 52, respectively, and completing current conducting paths 74 through 80 by generally known techniques, such as by surface or internal traces (e.g. printed circuit patterns) on a power substrate circuit board or by wire bonding.

Figure 3:
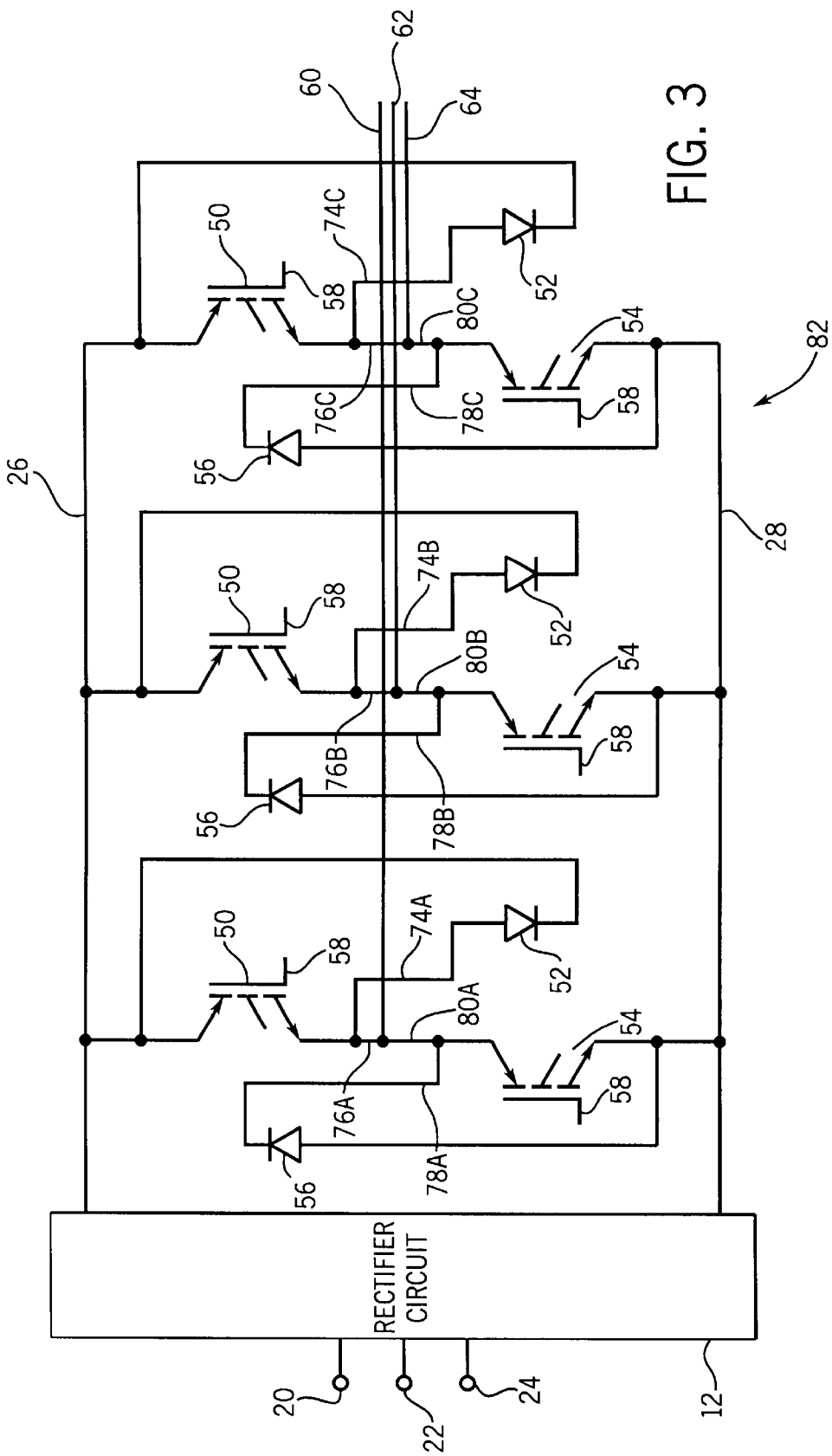
FIG. 3 is a schematic view of a component arrangement for reducing parasitic inductance in a three phase inverter.

FIG. 3 illustrates a three phase inverter circuit 82 incorporating a similar topology to that illustrated in FIG. 2. As shown in FIG. 3, inverter circuit 82 includes three pairs of switching circuits, each including a high side switching device 50, a low side switching device 54 in series with device 50, and flyback diodes 52 and 56 electrically coupled in parallel with devices 50 and 54, respectively. Each pair of switching devices is coupled across high and low side lines 26 and 28 of a DC bus, and an output line 60, 62 and 64 is coupled between each pair of switching devices for conducting three phases of controlled AC power generated by coordinated switching of devices 50 and 54 through respective base drives 58.

In each pair of switching circuits, high side switching device 50 is physically located adjacent to low side diode 56, while low side switching device 54 is physically located adjacent to high side diode 52. Moreover, a portion of current conducting paths 74A, 74B, 74C linking high side switching devices 50 to diodes 52 is physically positioned adjacent to a portion of current conducting paths 76A, 76B, 76C, respectively, linking high side switching devices 50 to their respective output lines 60, 62 and 64. Similarly, a portion of current conducting paths 78A, 78B, 78C linking low side switching devices 54 to diodes 56 is physically positioned adjacent to a portion of current conducting paths 80A, 80B, 80C, respectively, linking low side switching devices 54 to their respective output line 60, 62 and 64. As discussed above with respect to circuit 72 of FIG. 2, the physical placement of these elements and conducting paths permits current carrying paths between each switching device and its opposing diode to be considerably shortened as compared to existing inverter circuitry. This judicious placement and routing of the components and current carrying paths thus cancels or reduces parasitic inductance in circuit 82, thereby improving the waveform of the output, particularly during turnoff phases of switching.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, while the inverter circuits described above include a pair of switching devices per phase, in higher power applications, several parallel switching devices with associated flyback diodes may be used to accomplish the switching of each device described. However, the physical placement of the of the respective switching devices and flyback diodes nevertheless follows the topology described above to accomplish cancellation or reduction of parasitic inductance during switching.

I claim:

1. An inverter circuit for converting direct current power from a direct current bus to controlled alternating current power, comprising:
   a high side switching device coupled between a high side of the bus and an output line;
   a low side switching device coupled between a low side of the bus and the output line;
   a first flyback diode electrically coupled in parallel with the high side switching device and disposed physically adjacent to the low side switching device; and
   a second flyback diode electrically coupled in parallel with the low side switching device and disposed physically adjacent to the high side switching device.

2. The inverter circuit of claim 1, wherein the first flyback diode is coupled in parallel with the high side switching device via a first current conducting path, at least a portion of the first current path being physically adjacent to a current path coupling the low side switching device to the output line.

3. The inverter circuit of claim 1, wherein the second flyback diode is coupled in parallel with the low side switching device via a second current conducting path, at least a portion of the second current path being physically adjacent to a current path coupling the high side switching device to the output line.

4. The inverter circuit of claim 1, wherein the first and second switching devices are insulated gate bipolar transistors.

5. The inverter circuit of claim 1, wherein the first and second switching devices are semiconductor controlled rectifiers.

6. The inverter circuit of claim 1, wherein the direct current bus conducts direct current power from a rectifier circuit to the inverter circuit.

7. A three phase inverter circuit for converting direct current electrical power from a direct current bus to alternating current, comprising:
   first, second and third phase inverters, each inverter including:
      a high side switching device coupled between a high side of the bus and a respective output line;
      a low side switching device coupled between a low side of the bus and the output line;
      a first flyback diode electrically coupled in parallel with the high side switching device and disposed physically adjacent to the low side switching device; and
      a second flyback diode electrically coupled in parallel with the low side switching device and disposed physically adjacent to the high side switching device.

8. The inverter circuit of claim 7, wherein the first flyback diode of each inverter is coupled in parallel with the high side switching device of the inverter via a first current conducting path, at least a portion of the first current path being physically adjacent to a current path coupling the low side switching device of the inverter to the associated output line.

9. The inverter circuit of claim 7, wherein the second flyback diode of each inverter is coupled in parallel with the low side switching device via a second current conducting path, at least a portion of the second current path being physically adjacent to a current path coupling the high side switching device of the inverter to the output line.

10. The inverter circuit of claim 7, wherein the first and second switching devices of each inverter are insulated gate bipolar transistors.

11. The inverter circuit of claim 7, wherein the first and second switching devices of each inverter are semiconductor controlled rectifiers.

12. The inverter circuit of claim 7, wherein the direct current bus conducts direct current power from a rectifier circuit to the inverter circuit.

13. A power substrate for converting alternating current power from a source to controlled frequency alternating current power, comprising:
   a rectifier circuit for converting alternating current power from the source to direct current power;
   a direct current bus coupled to the rectifier circuit for conducting direct current power from the rectifier circuit, the bus having a high side bus and a low side bus; and
   an inverter circuit including a high side switching device coupled between the high side bus and an output line, a low side switching device coupled between the low side bus and the output line, a first flyback diode electrically coupled between the high side bus and the output line, and disposed physically adjacent to the low side switching device, and a second flyback diode electrically coupled between the low side bus and the output line, and disposed physically adjacent to the high side switching device.

14. The power substrate of claim 13, wherein the inverter circuit includes first, second and third phase inverters, each inverter including:
   a high side switching device coupled between a high side bus and a respective output line;
   a low side switching device coupled between a low side bus and the respective output line;
   a first flyback diode electrically coupled between the high side bus and the respective output line, and disposed adjacent to the low side switching device; and
   a second flyback diode electrically coupled between the low side bus and the respective output line, and disposed adjacent to the high side switching device.

15. The power substrate of claim 13, wherein the first flyback diode is coupled in parallel with the high side switching device via a first current conducting path, at least a portion of the first current path being physically adjacent to a current path coupling the low side switching device to the output line.

16. The power substrate of claim 13, wherein the second flyback diode is coupled in parallel with the low side switching device via a second current conducting path, at least a portion of the second current path being physically adjacent to a current path coupling the high side switching device to the output line.

17. The power substrate of claim 13, wherein the first and second switching devices are insulated gate bipolar transistors.

18. The power substrate of claim 13, wherein the first an d second switching devices are semiconductor controlled rectifiers.

* * * * *